US012687883B2

(12) United States Patent
Ma et al.

(10) Patent No.: US 12,687,883 B2
(45) Date of Patent: Jul. 21, 2026

(54) TIMESTAMP SYNCHRONIZATION ACROSS VIRTUAL MACHINES

(71) Applicant: Google LLC, Mountain View, CA (US)

(72) Inventors: Xiaoqin Ma, Los Altos, CA (US); Enrico Granata, Florence, MT (US)

(73) Assignee: Google LLC, Mountain View, CA (US)

( * ) Notice: Subject to any disclaimer, the term of this patent is extended or adjusted under 35 U.S.C. 154(b) by 109 days.

(21) Appl. No.: 18/777,143

(22) Filed: Jul. 18, 2024

(65) Prior Publication Data

US 2025/0085739 A1 Mar. 13, 2025

Related U.S. Application Data

(60) Provisional application No. 63/581,956, filed on Sep. 11, 2023.

(51) Int. Cl.
| | |
|---|---|
| *G06F 1/12* | (2006.01) |
| *G06F 1/04* | (2006.01) |
| *G06F 1/14* | (2006.01) |
| *G06F 9/455* | (2018.01) |
| *G06F 11/34* | (2006.01) |

(52) U.S. Cl.
CPC ............ *G06F 1/12* (2013.01); *G06F 9/45533* (2013.01); *G06F 1/04* (2013.01); *G06F 1/14* (2013.01); *G06F 11/3466* (2013.01)

(58) Field of Classification Search
CPC .... G06F 1/12; G06F 11/3466; G06F 9/45533; G06F 1/14; G06F 1/04
USPC ............ 713/375, 400, 502, 503, 600; 718/1
See application file for complete search history.

(56) References Cited

U.S. PATENT DOCUMENTS

| | | | | |
|---|---|---|---|---|
| 6,751,573 | B1 * | 6/2004 | Burch ................. | G06F 11/3495 |
| | | | | 713/502 |
| 8,146,078 | B2 * | 3/2012 | Bennett ............... | G06F 9/45533 |
| | | | | 713/400 |
| 10,860,197 | B1 * | 12/2020 | Gibeau ............... | G06F 11/3452 |
| 11,481,240 | B2 * | 10/2022 | Shamaiah ........... | G06F 9/45558 |
| 2006/0225073 | A1 * | 10/2006 | Akagawa ................. | G06F 9/52 |
| | | | | 718/1 |
| 2011/0252266 | A1 | 10/2011 | Costa | |
| 2016/0112182 | A1 | 4/2016 | Karnes | |
| 2020/0218697 | A1 * | 7/2020 | Ghuge ............... | G06F 16/1734 |
| 2021/0303021 | A1 | 9/2021 | Cui | |
| 2022/0350631 | A1 | 11/2022 | Parry-barwick et al. | |

OTHER PUBLICATIONS

"1588—IEEE Standard for a Precision Clock Synchronization Protocol for Networked Measurement and Control Systems", IEEE Standards, Nov. 8, 2019, 154 pp.
"Architecture", Retrieved from: https://source.android.com/docs/automotive/virtualization/architecture, Accessed on: May 17, 2023, 12 pp.

(Continued)

*Primary Examiner* — Ji H Bae
(74) *Attorney, Agent, or Firm* — Shumaker & Sieffert, P.A.

(57) ABSTRACT

Timestamp synchronization may be performed by determining a time offset between a first virtual machine having a first virtual clock counter of a computing system and a second virtual machine having a second virtual clock counter of the computing system; and adjusting timestamps of traces with timestamps based on the second virtual clock counter according to the time offset.

18 Claims, 6 Drawing Sheets

(56) References Cited

OTHER PUBLICATIONS

Aring et al., "Bring network and time together using Linux tracing", Retrieved from: chrome-extension://efaidnbmnnnibpcajpcglclefindmkaj/ https://netdevconf.info/0x16/papers/7/aring_paper.pdf, Dec. 14, 2022, 7 pp.

Henderson, "Clock Synchronisation over Wi-Fi Networks", Retrieved from: https://jackhenderson.com.au/projects/time-synchronisation, Accessed on: May 17, 2023, 12 pp.

Red Hat, "Virtualization Deployment and Administration Guide: Chapter 8", Red Hat Enterprise Linux 7, Red Hat, Inc., Oct. 17, 2023, pp. 60-63, URL: https://docs.redhat.com/en/documentation/ red_hat_enterprise_linux/7/html/virtualization_deployment_and_ administration_guide/chap-kvm_guest_timing_management#chap-KVM_guest_timing_management.

Wikipedia, "Precision Time Protocol", Wikipedia, Wikimedia Foundation, Inc., 2024, 10 pp., Retrieved from the Internet on Jul. 18, 2024 from URL: https://en.wikipedia.org/wiki/Precision_Time_ Protocol.

* cited by examiner

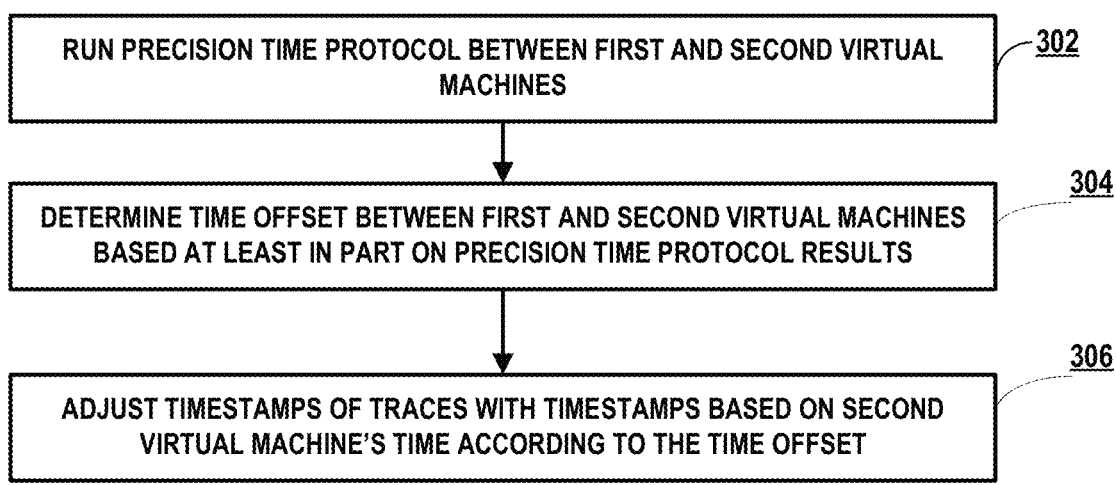

RUN PRECISION TIME PROTOCOL BETWEEN FIRST AND SECOND VIRTUAL MACHINES — 302

DETERMINE TIME OFFSET BETWEEN FIRST AND SECOND VIRTUAL MACHINES BASED AT LEAST IN PART ON PRECISION TIME PROTOCOL RESULTS — 304

ADJUST TIMESTAMPS OF TRACES WITH TIMESTAMPS BASED ON SECOND VIRTUAL MACHINE'S TIME ACCORDING TO THE TIME OFFSET — 306

FIG. 3A

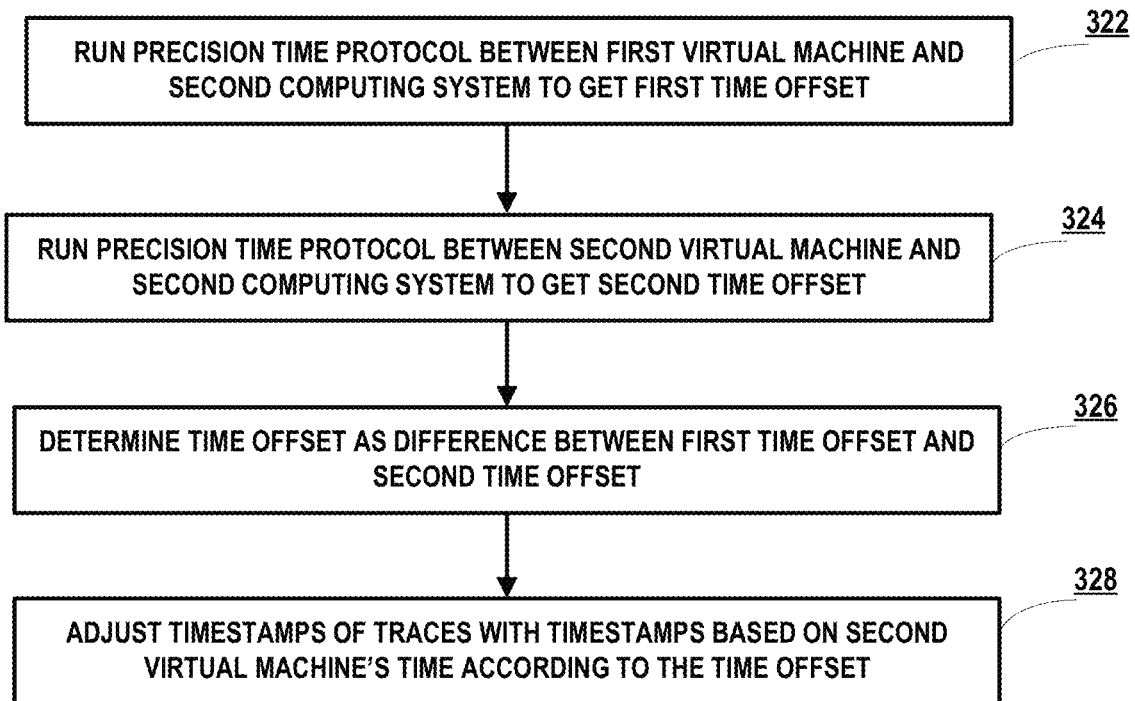

RUN PRECISION TIME PROTOCOL BETWEEN FIRST VIRTUAL MACHINE AND SECOND COMPUTING SYSTEM TO GET FIRST TIME OFFSET — 322

RUN PRECISION TIME PROTOCOL BETWEEN SECOND VIRTUAL MACHINE AND SECOND COMPUTING SYSTEM TO GET SECOND TIME OFFSET — 324

DETERMINE TIME OFFSET AS DIFFERENCE BETWEEN FIRST TIME OFFSET AND SECOND TIME OFFSET — 326

ADJUST TIMESTAMPS OF TRACES WITH TIMESTAMPS BASED ON SECOND VIRTUAL MACHINE'S TIME ACCORDING TO THE TIME OFFSET — 328

FIG. 3B

DETERMINE A TIME OFFSET BETWEEN A FIRST VIRTUAL MACHINE HAVING A FIRST VIRTUAL CLOCK COUNTER OF A COMPUTING SYSTEM AND A SECOND VIRTUAL MACHINE HAVING A SECOND VIRTUAL CLOCK COUNTER OF THE COMPUTING SYSTEM — 602

ADJUST TIMESTAMPS OF TRACES WITH TIMESTAMPS BASED ON THE SECOND VIRTUAL CLOCK COUNTER ACCORDING TO THE TIME OFFSET — 604

TIMESTAMP SYNCHRONIZATION ACROSS VIRTUAL MACHINES

This application claims the benefit of U.S. Provisional Patent Application No. 63/581,956, filed 11 Sep. 2023, the entire contents of which is incorporated herein by reference.

BACKGROUND

In a virtualized environment, each virtual machine (VM) has a virtual clock counter that is set up at boot time by a hypervisor. As a VM is suspended and resumed, the virtual clock counter of the VM may become out of sync with the virtual clock counter of other VMs, resulting in time drift between the VMs. When the VMs store traces with time-stamps according to each VM's virtual clock, the time drift between the VMs makes it difficult to reconcile traces from the VMs.

SUMMARY

In general, the techniques of this disclosure are directed to synchronizing timestamps across virtual machines that may be used by computing systems when generating traces of programs. The techniques include determining a time offset between first and second virtual machines (VMs) being executed by a computing system and adjusting timestamps of traces with timestamps based on the second VM's time using the time offset. The adjustments correct the trace data generated by the second VM to be in synchronization with traces generated by the first VM.

In some aspects, the techniques described herein relate to a method including determining a time offset between a first virtual machine having a first virtual clock counter of a computing system and a second virtual machine having a second virtual clock counter of the computing system; and adjusting timestamps of traces with timestamps based on the second virtual clock counter according to the time offset.

In some aspects, the techniques described herein relate to a computing system including a memory to store a first virtual clock counter of a first virtual machine and a second virtual clock counter of a second virtual machine; and a processor to determine a time offset between the first virtual clock counter and the second virtual clock counter; and adjust timestamps of traces with timestamps based on the second virtual clock counter according to the time offset.

In some aspects, the techniques described herein relate to an apparatus including means for determining a time offset between a first virtual machine having a first virtual clock counter of a computing system and a second virtual machine having a second virtual clock counter of the computing system; and adjusting timestamps of traces with timestamps based on the second virtual clock counter according to the time offset.

In some aspects, the techniques described herein relate to a non-transitory computer-readable storage medium including instructions, that when executed by one or more processors of a computing system, cause the one or more processors to determine a time offset between a first virtual machine having a first virtual clock counter of a computing system and a second virtual machine having a second virtual clock counter of the computing system; and adjust timestamps of traces with timestamps based on the second virtual clock counter according to the time offset.

The details of one or more examples are set forth in the accompanying drawings and the description below. Other features, objects, and advantages of the disclosure will be apparent from the description and drawings, and from the claims.

BRIEF DESCRIPTION OF THE DRAWINGS

FIGS. 3A and 3B are flow charts of example processes for an example computing system to synchronize timestamps, in accordance with aspects of this disclosure.

DETAILED DESCRIPTION

Figure 1:
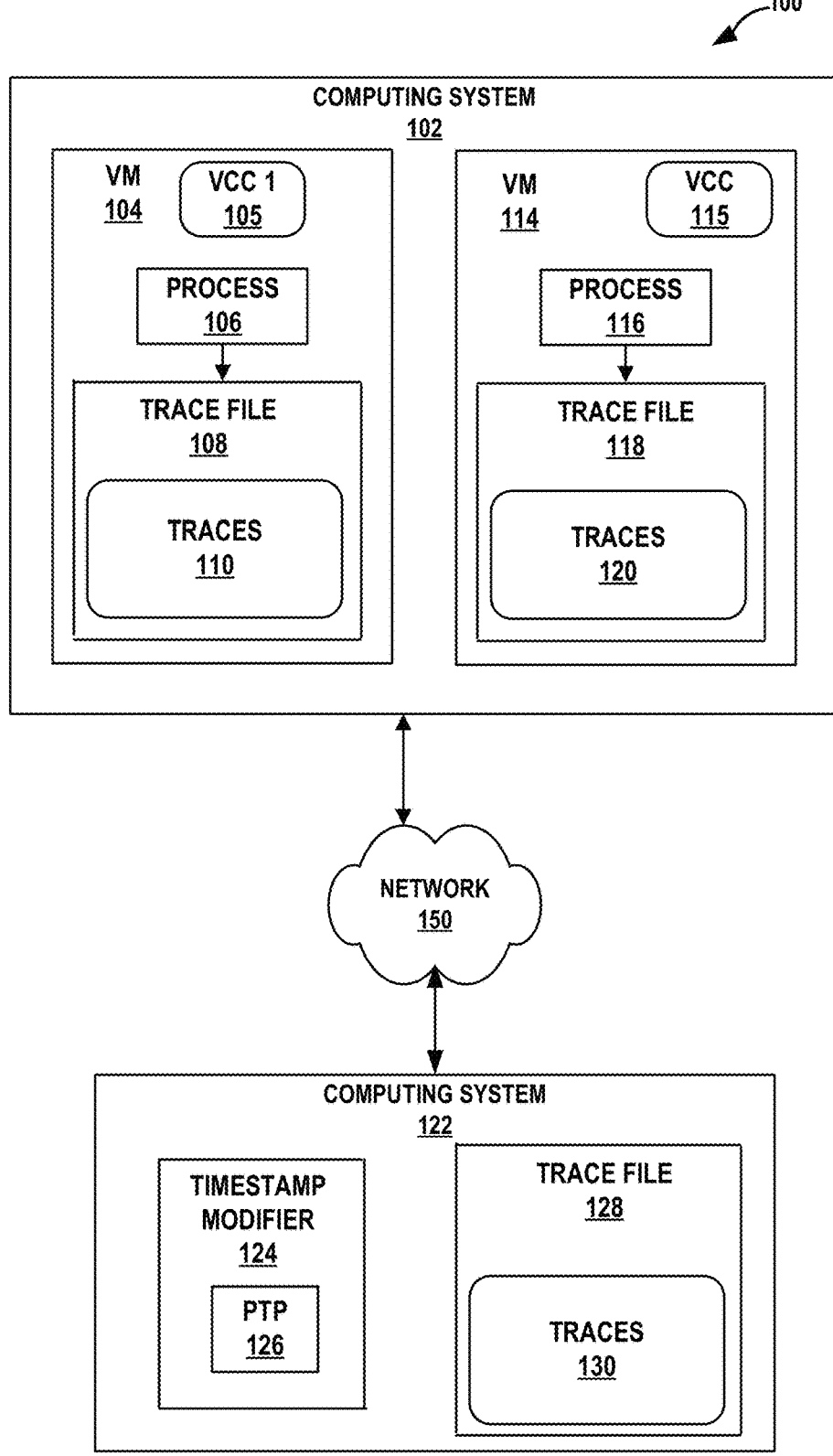
FIG. 1 is a conceptual diagram illustrating an example environment for timestamp synchronization, in accordance with one or more aspects of the present disclosure.

FIG. 1 is a conceptual diagram illustrating an example environment for timestamp synchronization, in accordance with one or more aspects of the present disclosure. Computing environment 100 includes computing systems 102 and 122 communicatively coupled by network 150. Computing system 102 includes virtual machine (VM) 104 and VM 114. Each of VM 104 and VM 114 include a respective virtual clock counter (VCC) 105 and VCC 115 that is set up at boot time by a hypervisor (not shown in FIG. 1). Thus, each of VM 104 and VM 114 includes its own local time based on VCC 105 and VCC 115, respectively. For example, VM 104 includes VCC 105 and VM 114 includes VCC 115. VM 104 and VM 114 may both run at least one process that may generate trace information and store the trace information in a trace file. For example, process 106 of VM 104 creates trace file 108 and stores traces 110 in trace file 108. Traces 110 may include timestamps based on VM 104 time (e.g., from VCC 105 of VM 104). Similarly, process 116 of VM 114 creates trace file 118 and stores traces 120 in trace file 118. Traces 120 may include timestamps based on VM 114 time (e.g., from VCC 115 of VM 114).

A technical problem with this arrangement, however, is that as VM 104 and VM 114 are suspended and resumed, VCC 105 and VCC 115 of VM 104 and VM 114, respectively, may diverge (e.g., time drift between VCC 105 and VCC 115 may arise). This may result in the local time of VM 104 becoming out of synchronization with the local time of VM 114. Because each VM 104, 114 may generate a trace file (e.g., trace files 108, 118) with trace information having timestamps based on the local time of each VM, reconciling the trace information in trace files across VMs may become difficult. For example, if trace file 108 and trace file 118 are input to a performance analysis tool to analyze the performance of computing system 102, any difference between the local times of VM 104 and VM 114 (as manifested in traces 110 and 120 generated based on times with timestamps based on local times of VM 104 and 114, respectively) may produce inaccurate analysis results.

The techniques described in the present disclosure provide a mechanism to adjust (and thereby synchronize) timestamps in traces stored in trace files generated by a plurality of VMs being executed by a computing system. For example, computing system 122 may determine a difference between local times of VM 104 and VM 114, and adjust the timestamps in traces 130 of trace file 128 according to the time difference. By adjusting the timestamps in the traces 130 of trace file 128, errors arising from time drift between the VMs may be corrected.

Computing system 102 and computing system 122 may represent any suitable computing system capable of sending and receiving information both to and from a network, such as network 150. In some examples, the components of computing system 102 and computing system 122 illustrated in FIG. 1 may reside and execute on the same or separate computing devices and systems operated by and/or under the control of one or more entities. In some examples, computing system 102 and computing system 122 may represent one or more cloud computing systems that provide access to their respective services via a cloud.

Computing system 122 may include timestamp modifier 124. Timestamp modifier 124 may perform operations described herein using software, hardware, firmware, or a mixture of hardware, software, and firmware residing in and/or executing at computing system 122 to perform functions associated with performing synchronization of timestamps on trace data. Computing system 122 may execute timestamp modifier 124 with multiple processors or multiple devices, as virtual machines executing on underlying hardware, as one or more services of an operating system or computing platform, and/or as one or more executable programs at an application layer of a computing platform of computing system 122.

Network 150 represents any public or private communications network, for instance, cellular, satellite, Wi-Fi, and/or other types of networks, for transmitting data between computing systems, servers, and computing devices. Network 150 may include one or more network hubs, network switches, network routers, or any other network equipment, that are operatively inter-coupled thereby providing for the exchange of information between computing systems 102, 122. Computing systems 102,122 may transmit and receive data across network 150 using any suitable communication techniques. Each computing system 102,122 may be operatively coupled to network 150 using respective network links, such as Ethernet, Wi-Fi, or any other types of wired and/or wireless network connections.

Computing systems 102, 122 each represent an individual mobile or non-mobile computing device. Examples of computing systems 102, 122 include a mobile phone, a tablet computer, a laptop computer, a desktop computer, a server, a mainframe, a set-top box, a television, a wearable device (e.g., a computerized watch, computerized eyewear, computerized headphones, augmented reality (AR) glasses/goggles, virtual reality (VR) glasses/goggles, artificial intelligence (AI)-enabled glasses/goggles, computerized gloves, etc.), a home automation device or system (e.g., an intelligent thermostat or home assistant device), a gaming system, a media player, an e-book reader, a mobile television platform, an automobile navigation or infotainment system, or any other type of mobile, non-mobile, wearable, and non-wearable computing device.

Timestamp modifier 124 may modify traces with the timestamps of VM 104 and 114. Computing system 122 may execute timestamp modifier 124 to modify traces 110 including timestamps based on the local time of VM 104 (from VCC 105) of trace file 108 and/or traces 120 including timestamps based on the local time of VM 114 (from VCC 115) of trace file 118 to produce trace file 128 including traces 130 with timestamps based on a synchronized time. Trace file 128 may be stored in any storage device accessible to computing system 122. As used herein, synchronized time may be a time selected to be used as a common time between the VMs 104, 114 such that the timestamps in trace file 128 are based on the common time between the VMs 104, 114. For example, timestamp modifier 124 may adjust the local time of VM 104 and traces 110 to be based on the local time of VM 114 as the synchronized time. In some examples, the synchronized time may be another time of computing system 102 and traces 110 and traces 120 with timestamps are both adjusted by timestamp modifier 124 to be based on this other time of computing system 102.

Timestamp modifier 124 may use Precision Time Protocol (PTP) 126 to determine a time offset between VM 104 and VM 114. The PTP is a protocol used to synchronize clocks throughout a computer network or system. In an implementation, the "Standard for a Precision Clock Synchronization Protocol for Networked Measurement and Control Systems," Institute of Electrical and Electronics Engineers (IEEE) 1588-2019 (PTPv2.1), November 2019, may be used. Generally, PTP 126 may be used to synchronize clocks by having two computing systems exchange their local times through messages with the assumption that communications delay between the two computing systems is constant. In some examples, computing environment 100 may use other mechanisms and/or techniques to determine a synchronized time between computing system components.

Timestamp modifier 124 of computing system 122 may perform operations described herein using software, hardware, firmware, or a mixture of hardware, software, and firmware residing in and/or executing at computing system 122 to perform functions associated with synchronizing timestamps in trace data. Computing system 122 may execute timestamp modifier 124 with multiple processors or multiple devices, as virtual machines executing on underlying hardware, as one or more services of an operating system or computing platform, and/or as one or more executable programs at an application layer of a computing platform of computing system 122.

Timestamp modifier 124, by adjusting the timestamps in the traces 130 of trace file 128, may correct errors arising from time drift between VMs. Timestamp modifier 124 may correct errors and improve performance analysis results based at least in part on traces 130. For example, timestamp modifier 124 may correct timestamp errors in trace file 128 and improve the accuracy of performance analytics related to the performance of one or more of VM 104 and VM 114.

The techniques of this disclosure may provide one or more practical advantages. The correction of time drift between VM 104 and VM 114 may enable a VM, such as VM 114, to correct drifts in time that occur when VM 114 is suspended and then later resumed. In addition, correction of time drift between VM 104 and VM 114 may enable a performance monitoring application to obtain more accurate performance metrics from VM 114.

Figure 2:
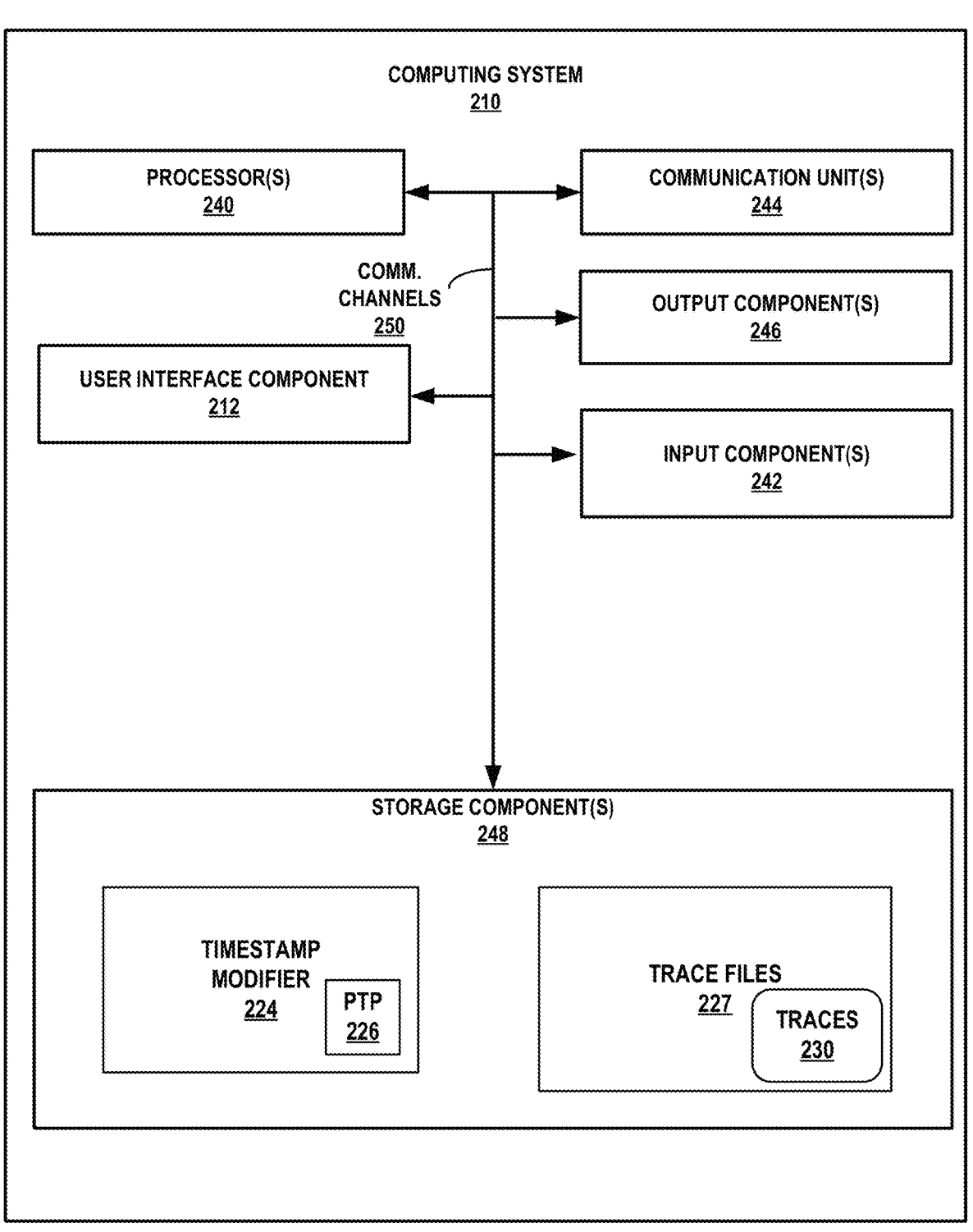
FIG. 2 is a block diagram illustrating further details of an example computing system for timestamp synchronization, in accordance with one or more aspects of the present disclosure.

FIG. 2 is a block diagram illustrating further details of an example computing system for timestamp synchronization, in accordance with one or more aspects of the present disclosure. For the purposes of clarity, FIG. 2 is described in the context of FIG. 1. For example, computing system 210 of FIG. 2 is described below as an example of computing system 122 as illustrated in FIG. 1.

Computing system 210 of FIG. 2 may be an example of a mobile phone, a tablet computer, a laptop computer, a desktop computer, a server, a mainframe, a set-top box, a television, a wearable device, a pair of AR glasses/goggles, a pair of VR glasses/goggle, a pair of AI-enabled glasses/goggles, a home automation device or system, a gaming system, a media player, an e-book reader, a mobile television platform, an automobile navigation or infotainment system, or any other type of mobile, non-mobile, wearable, and non-wearable computing device configured to receive, and output an indication of notification data. FIG. 2 illustrates only one example of computing system 210, and many other examples of computing system 210 may be used in other instances and may include a subset of the components included in example computing system 210 or may include additional components not shown in FIG. 2.

As shown in the example of FIG. 2, computing system 210 includes UIC 212 (illustrated as "USER INTERFACE COMPONENT 212"), one or more processors 240, one or more input components 242, one or more communication units 244, one or more output components 246, one or more storage components 248, and one or more communication channels 250 (illustrated as "COMM. CHANNELS 250" in FIG. 2). One or more storage components 248 of computing system 210 include timestamp modifier 224 (including PTP 226) and one or more trace files 227 (including traces 230). Timestamp modifier 224 may be an example of timestamp modifier 124 shown in FIG. 1, and trace files 227 may be an example of one or more of trace file 108, trace file 118, and/or trace file 128, shown in FIG. 1. For example, trace file 227 may include a shared memory page of a guest VM and a host VM.

Communication channels 250 may interconnect each of the components 240, 212, 244, 246, 242, and 248 for inter-component communications (physically, communicatively, and/or operatively). Communication channels 250 may include one or more components, such as a system bus, a network connection, an inter-process communication data structure, or any other method for communicating data. For example, communication channels 250 may include an interconnect between one or more components of computing system 210.

One or more of input components 242 of computing system 210 may receive input. Examples of input are tactile, audio, and video input. Input components 242 of computing system 210 may include one or more of presence-sensitive displays, touch-sensitive screens, mice, keyboards, voice responsive systems, video cameras, microphones or any other types of devices for detecting input from a human or machine.

One or more of output components 246 of computing system 210 may generate output. Examples of output are tactile, audio, and video output. Output components 246 of computing system 210 may include a presence-sensitive displays, sound cards, video graphics adapter cards, speakers, liquid crystal displays (LCD), organic light-emitting diode (OLED) displays, light field displays, haptic motors, linear actuating devices, or any other types of devices for generating output to a human or machine.

One or more of communication units 244 of computing system 210 may communicate with external devices via one or more wired and/or wireless networks by transmitting and/or receiving network signals on the one or more networks (such as network 150 of FIG. 1). Examples of communication units 244 may include network interface cards (e.g., an Ethernet card), optical transceivers, radio frequency transceivers, GPS receivers, or any other types of devices that can send and/or receive information. Other examples of one or more communication units 244 may include short wave radios, cellular data radios, wireless network radios, as well as universal serial bus (USB) controllers.

UIC 212 of computing system 210 may be hardware that functions as an input and/or output device for computing system 210. For example, UIC 212 may include a display component, which may be a screen at which information is displayed by UIC 212 and a presence-sensitive input component that may detect an object at and/or near the display component. UIC 212 may include one or more components of input components 242 and/or output components 246.

One or more of processors 240 may implement functionality and/or execute instructions within computing system 210. For example, one or more of processors 240 on computing system 210 may receive and execute instructions stored by one or more storage components 248 that execute the functionality of timestamp modifier 224. The instructions executed by one or more of processors 240 may cause computing system 210 to store information within one or more storage components 248 during program execution. Examples of one or more of processors 240 include application processors, display controllers, sensor hubs, and any other hardware configured to function as a processing unit. One or more processors of 240 may execute instructions of timestamp modifier 224 to perform actions or functions. That is, timestamp modifier 224 may be operable by one or more processors 240 to perform various actions or functions of computing system 210.

One or more storage components 248 within computing system 210 may store information. For example, storage components 248 may store information and/or instructions for processing during operation of computing system 210. That is, computing system 210 may store data (e.g., trace files 227) accessed by timestamp modifier 224 during execution at computing system 210. In some examples, one or more of storage components 248 may be a temporary memory and provide short-term storage. One or more of storage components 248 on computing system 210 may provide short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

One or more of storage components 248, in some examples, also include one or more computer-readable storage media. One or more of storage components 248 may store larger amounts of information than volatile memory. One or more of storage components 248 may provide long-term storage of information as non-volatile memory space and retain information after power on/off cycles. Examples of non-volatile memories include magnetic hard disks, optical discs, flash memories, magnetic tape drives, or forms of electrically programmable memories (EPROM) or electrically erasable and programmable (EEPROM) memories. One or more storage of components 248 may store program instructions and/or information (e.g., data) associated with timestamp modifier 224. Timestamp modifier 224 may execute at one or more processors 240 to perform functions similar to that of timestamp modifier 124 of FIG. 1.

Timestamp modifier 224, when executed by one or more of processors 240, may determine a time offset between a first virtual machine (e.g., VM 104) having a first virtual clock counter (e.g., VCC 105) of a computing system (e.g., 102) and a second virtual machine (VM 114) having a second virtual clock counter (e.g., 115) of the computing system; and adjust timestamps of traces with timestamps based on the second virtual clock counter according to the time offset. Timestamp modifier 224 may adjust the timestamps by subtracting the time offset from the timestamps. Timestamp modifier 224 may determine the time offset by running a precision time protocol (e.g., PTP 226 and/or PTP 126) between VM 104 and VM 114. Timestamp modifier 224 may determine the time offset by running a precision time protocol between VM 104 and a second computing system (e.g., computing system 210 and/or another computing system) to determine a first time offset, running the precision time protocol between VM 114 and the second computing system to determine a second time offset, and determining the time offset as a difference between the first time offset and the second time offset.

Timestamp modifier 224 may determine the time offset using communications between VMs. Timestamp modifier 224 may initializing communications channels to VM 104 and to VM 114; measure a delay time of the communications channels; get (e.g., obtain) a first local time of the VM 104; get a local time of VM 114; get a second local time of the VM 104; and determine the time offset as the first local time of VM 104 plus the second local time of VM 104 minus twice the local time of VM 114. Timestamp modifier 224 may update trace files, such as trace file 108, trace file 118, trace file 128, and/or trace files 227, using the communications between VMs. Timestamp modifier 224 may store timestamps of traces with timestamps based on the first virtual clock counter, and timestamps of traces with timestamps based on the second virtual clock counter as adjusted according to the time offset, in a trace file (e.g., one of trace files 227). Timestamp modifier 224 may periodically repeat determining the time offset and adjusting the timestamps.

FIGS. 3A and 3B are flow charts of example processes for an example computing system to synchronize timestamps, in accordance with aspects of this disclosure. For the purposes of clarity, FIGS. 3A and 3B are illustrated within the context of FIGS. 2 and 1. As shown in FIG. 2, computing system 210, which may be an example of computing system 122 of FIG. 1, may execute timestamp modifier 224 to perform timestamp synchronization of trace data (wherein timestamp modifier 224 is an example of timestamp modifier 124 of FIG. 1). In some examples, computing system 210 may perform one or more steps of FIGS. 3A-3B.

At block 302, timestamp modifier 224 runs Precision Time Protocol (PTP) (e.g., PTP 226) between a first VM (e.g., VM 104) and a second VM (e.g., VM 114). At block 304, timestamp modifier 224 determines a time offset between VM 104 and VM 114 based at least in part on the PTP results from block 302. Timestamp modifier 224 may read traces 110 (including timestamps based on the local time of VM 104) from trace file 108 and traces 120 (including timestamps based on the local time of VM 114) from trace file 118 as part of determining the time offset.

At block 306, timestamp modifier 224 creates trace file 128 with the contents of trace file 108 and trace file 118 and adjusts the timestamps of traces with timestamps based on the local time of VM 114 in trace file 128 using the time offset. For example, if the time of VM 114 is 100 microseconds later than the time of VM 104 according to the time offset, then timestamp modifier 224 may subtract time offset from timestamps based on the local time of VM 114. Timestamp modifier 224 may add time to the timestamps based on the time of VM 114, if the time of VM 114 is 100 microseconds earlier than the time of VM 104 according to the time offset. Timestamp modifier 224 may modify the traces with timestamps based on the time of VM 114 such that combined traces 130 include both traces with timestamps based on the local time of VM 104 (e.g., traces 110) and traces with timestamps based on the local time of VM 114 (e.g., traces 120) as adjusted according to the time offset. Timestamp modifier 224 may modify the timestamps such that the timestamps of traces 110 and traces 120 are synchronized. One or more performance analysis tools may use traces, such as traces 120, for accurate data regarding VM 114.

FIG. 3B illustrates an example process for synchronizing timestamps by one or more computing systems, such as computing system 210. At block 322, timestamp modifier 224 runs PTP between a first VM (e.g., VM 104) and computing system 122 to get a first time offset. At block 324, timestamp modifier 224 runs PTP between a second VM (e.g., VM 114 executing in computing system 102) and computing system 122 to get a second time offset. At block 326, timestamp modifier 224 determines the time offset as the difference between the first time offset and the second time offset. At block 328, timestamp modifier 224 creates trace file 128 with the contents of trace file 108 and trace file 118 and adjusts the timestamps of traces 120 in trace file 128 using the time offset.

In some examples, the time offset may not be constant over time. Timestamp modifier 224 may periodically determine the time offset as described above. Timestamp modifier 224 may store time offsets for subsequent timestamp modification processing. For example, timestamp modifier 224 may update and store time offsets according to a predetermined interval (e.g., every 10 minutes, every hour, daily, etc.). Timestamp modifier 224 may apply a selected time offset to a selected set of traces 120 according to the applicable time period for the selected time offset.

Figure 4:
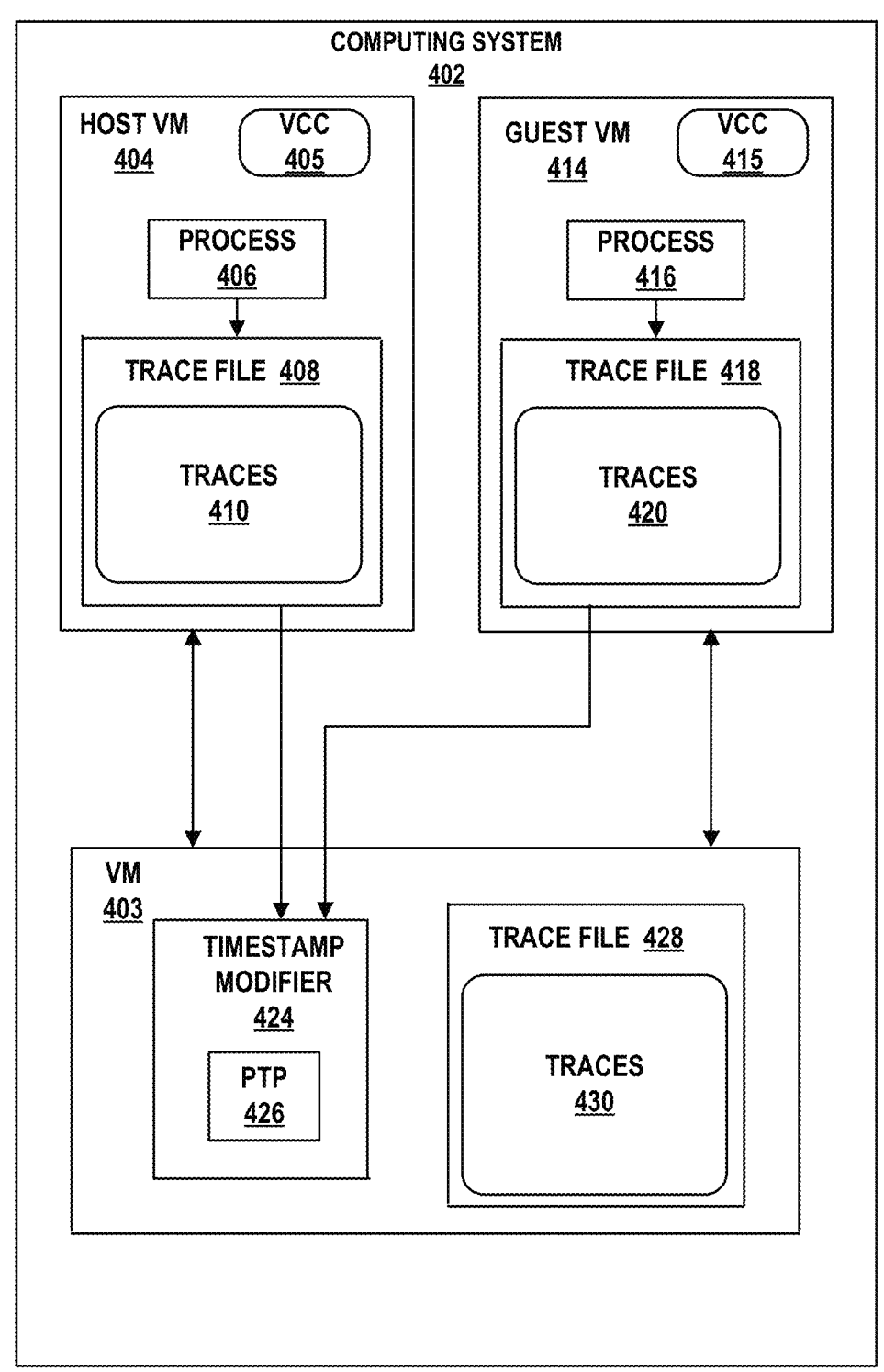
FIG. 4 is a conceptual diagram illustrating an example environment for timestamp synchronization, in accordance with one or more aspects of the present disclosure.

FIG. 4 is a conceptual diagram illustrating an example environment for timestamp synchronization, in accordance with one or more aspects of the present disclosure. In the example of FIG. 4, timestamp modifier 424 may be executed in another VM (e.g., VM 403) on the same computing system (e.g., computing system 402) executing a first VM, such as host VM 404, and a second VM, such as guest VM 414. Timestamp modifier 424 may execute in VM 403 to eliminate delays caused by networking communications between one or more computing systems such as computing system 102 and/or computing system 122 as illustrated in FIG. 1. For example, timestamp modifier 424 may execute in an execution environment of VM 403 to avoid transmission delays between computing systems.

In the example of FIG. 4, the first VM may be host VM 404 and the second VM may be guest VM 414, or vice versa. For example, process 406 of host VM 404 may create trace file 408 and store traces 410 with timestamps based on host VM 404 time from VCC 405 in trace file 408. Process 416 of guest VM 414 may create trace file 418 and store traces 420 with timestamps based on guest VM 414 time from VCC 415 in trace file 418. Timestamp modifier 424 may use Precision Time Protocol (PTP) 426 to determine a time offset between VCC 405 of host VM 404 and VCC 415 of guest VM 414. Timestamp modifier 424 may be executed by computing system 402 in VM 403 to modify traces 420 with timestamps based on guest VM 414 time and traces 410 with timestamps based on host VM 404 time to produce trace file 428 including traces 430 based on a synchronized time.

Host VM 404 may store information regarding time and clock counts in traces 410 for use by guest VM 414. For example, host VM 404 may store counter information of one or more processors of computing system 402 as well as information regarding the time of host VM 404 in a shared memory page that includes trace file 408. Guest VM 414 may determine that a clock of guest VM 414 should be updated. Guest VM 414 may read the counter information and/or time stored in trace file 408 and calculate the time of host VM 404. Guest VM 414 may update the clock of guest VM 414. In some examples, timestamp modifier 424 may update the clock of guest VM 414 using the shared memory page that includes trace file 408.

In some examples, virtual socket capability may enable communications between timestamp modifier 424, host VM 404 and guest VM 414 and facilitate connections between VMs and a host computing system (e.g., computing system 402). Timestamp modifier 424 may use a virtual socket to obtain a snapshot of a tick count of a processor of computing system 402 and/or the current host clock time of computing system 402. In addition, timestamp modifier 424 may calculate a delay associated with the virtual socket (e.g., processing and transmission delay associated with obtaining the tick count/time of a host, such as computing system 402). Timestamp modifier 424 may calculate the delay and generate an offset used to adjust the clock. In some examples where a delay from the virtual socket is negligible or otherwise below a predetermined threshold, guest VM 414 may obtain the host clock time via the virtual socket without using timestamp modifier 424 or generating an offset.

Figure 5:
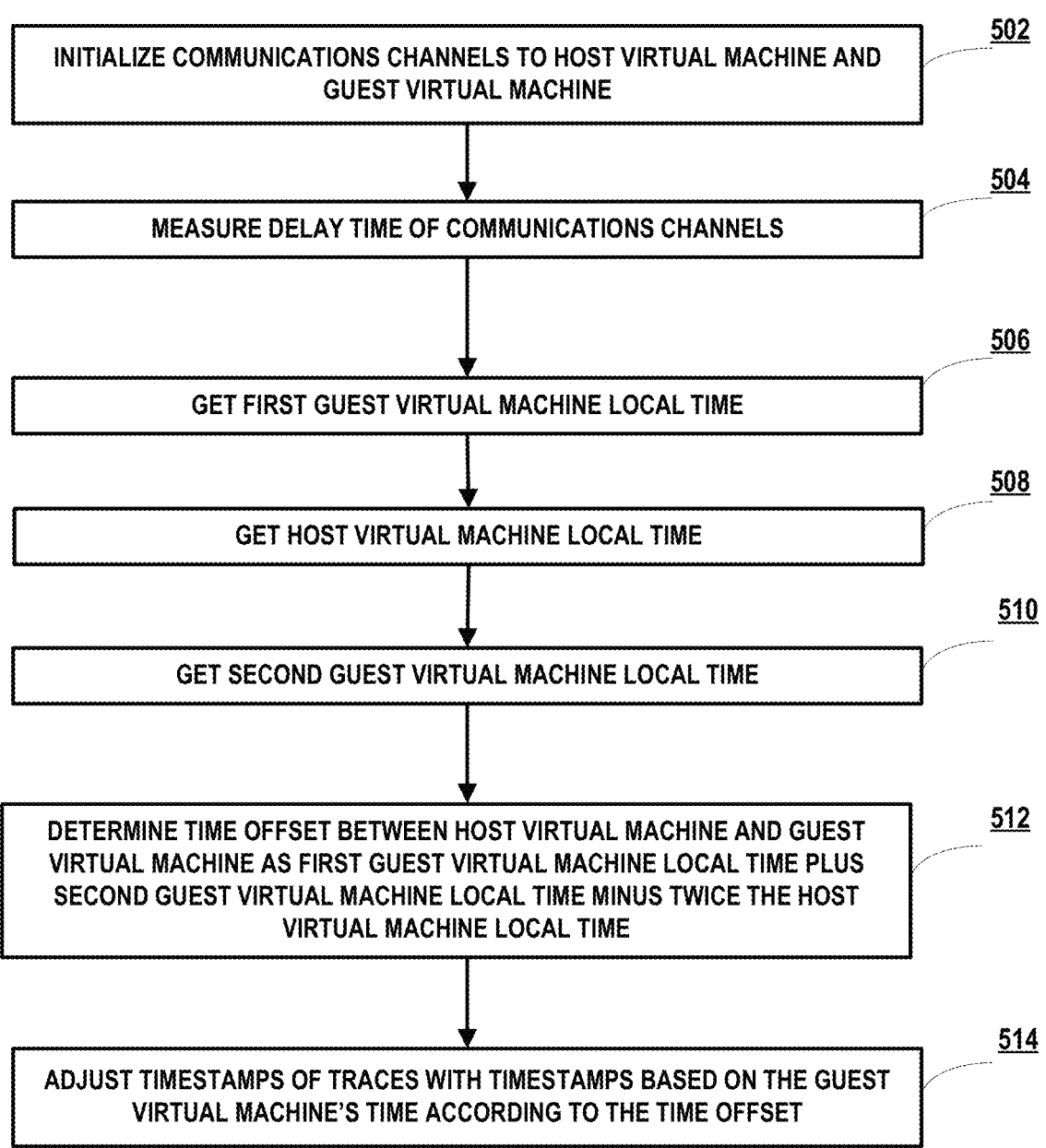
FIG. 5 is a flow chart of an example process for an example computing system to synchronize timestamps, in accordance with aspects of this disclosure.

FIG. 5 is a flow chart of an example process for an example computing system to synchronize timestamps, in accordance with aspects of this disclosure. For the purposes of clarity, FIG. 5 is described in the context of FIG. 4. For example, a timestamp modifier, such as time stamp modifier 424, may synchronize timestamps of a computing system such as computing system 402.

At block 502, timestamp modifier 424 initializes communications channels to a host VM, such as host VM 404, and a guest VM, such as guest VM 414. At block 504, timestamp modifier 424 measures a delay time of the communications channels. For example, timestamp modifier 424 may measure a delay time to generate a time offset consistent with the delay time.

At block 506, timestamp modifier 424 gets a first guest VM 414 local time. At block 508, timestamp modifier 424 gets a host VM 404 local time. For example, timestamp modifier 424 may get the local time of host VM 404 using a remote procedure call (RPC) to host VM 404.

Timestamp modifier 424 at block 510 gets a second local time of guest VM 414. Timestamp modifier 424 may get a second local time from guest VM 414 while waiting for a response from host VM 404. For example, timestamp modifier 424 gets the second local time while waiting for a response from host VM 404 on the request for the local time of host VM 404.

Timestamp modifier 424 may get local time from host VM 404 that may be equal to the first local time of guest VM 414 plus the delay time minus a time offset. Timestamp modifier 424 may get a second local time from guest VM 414 that is equal to the local time of host VM 404 plus the time offset plus the delay time. Accordingly, timestamp modifier 424 may determine that the delay time is equal to the second local time of guest VM 414 minus the first local time of guest VM 414, divided by two. Thus, at block 512, timestamp modifier 424 may determine the time offset between the host VM 404 and the guest VM 414 to be the first local time of guest VM 414 plus the second local of time of guest VM 414 minus twice the local time of host VM 404. At block 514, timestamp modifier 424 adjusts the timestamps of traces (e.g., traces 420) based on the local time of guest VM 414 according to the time offset.

Timestamp modifier 424 may subtract time from timestamps of one or more VMs of computing system 402. In an example, if the time of guest VM 414 is 100 microseconds later than the time of host VM 404 according to the time offset, then timestamp modifier 424 may subtract the time offset from timestamps based on the time of guest VM 414. Timestamp modifier 424 may add time to timestamps of one or more VMs of computing system 402. In an example, timestamp modifier 424 determines that time of guest VM 414 is 100 microseconds earlier than the time of host VM 404 according to the time offset, timestamp modifier 424 adds the time offset to timestamps based on the time of host VM 404. Timestamp modifier 424 may adjust traces with timestamps based on the time of guest VM 414 such that combined traces 430 include both traces with timestamps based on the time of host VM 404. In addition, timestamp modifier 424 may modify timestamps based on the time of guest VM 414 as adjusted according to the time offset. Thus, timestamp modifier 424 may synchronize timestamps. Timestamp modifier 424 may synchronize the timestamps such that traces 430 with timestamps based on the synchronized time may be accurately used by performance analysis tools.

Figure 6:
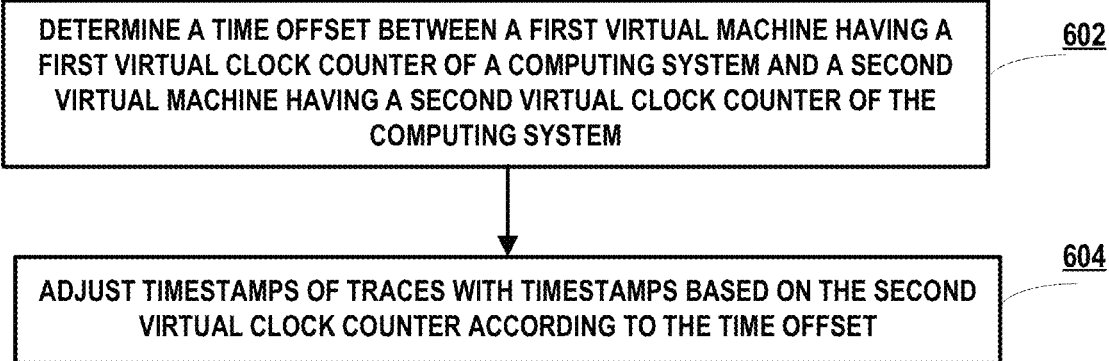
FIG. 6 is a flow chart of an example process for an example computing system to synchronize timestamps, in accordance with aspects of this disclosure.

FIG. 6 is a flow chart of an example process for an example computing system to synchronize timestamps, in accordance with aspects of this disclosure. For the purposes of clarity, FIG. 6 is described in the context of FIG. 4. For example, computing system 402 as illustrated in FIG. 4 may perform one or more steps of the process illustrated in FIG. 6.

At block 602, a timestamp modifier, such as timestamp modifier 424, determines a time offset between a first virtual machine, such as host VM 404, having a first virtual clock counter, such as VCC 405, of a computing system 402 and a second virtual machine, such as guest VM 414, having a second virtual clock counter, such as VCC 415, of computing system 402. Timestamp modifier 424 may determine a time offset that is a positive time offset (e.g., guest VM 414 having a time further "forwards" in time compared to time of host VM 404). Timestamp modifier 424 may determine a time offset that is a negative offset (e.g., guest VM 414 having a time "behind" in time compared to time of host VM 204).

At block 604, timestamp modifier 424 adjusts timestamps of traces with timestamps based on the second virtual clock counter (e.g., traces with timestamps based on guest VM 414 time managed by VCC 415) according to the time offset. Timestamp modifier 424 may adjust the timestamps of traces "forwards" or "backwards" in time. For example, timestamp modifier 424 may adjust the timestamp of traces to advance the timestamp forward in time.

Timestamp modifier 424 may synchronize timestamps of trace data, as described herein, generated by multiple virtual machines being executed in a computing system, to result in more accurate trace data that may be used to analyze the performance of the computing system. The increase in accuracy of trace data may improve the operation of the computing system by enabling the identification of issues affecting the first and/or second virtual machine's functionality.

In this way, various aspects of the techniques described in this disclosure may enable the following examples.

Example 1 is method including determining a time offset between a first virtual machine having a first virtual clock counter of a computing system and a second virtual machine having a second virtual clock counter of the computing system; and adjusting timestamps of traces with timestamps based on the second virtual clock counter according to the time offset.

Example 2. The method of example 1, wherein adjusting the timestamps of traces includes subtracting the time offset from the timestamps of traces.

Example 3. The method of any one of examples 1 to 2, wherein determining the time offset includes running a precision time protocol between the first virtual machine and the second virtual machine.

Example 4. The method of any one of example 1 to 2, wherein determining the time offset includes running a precision time protocol between the first virtual machine and a second computing system to determine a first time offset, running the precision time protocol between the second virtual machine and the second computing system to determine a second time offset, and determining the time offset as a difference between the first time offset and the second time offset.

Example 5. The method of any one of examples 1 to 2, wherein determining the time offset includes initializing communications channels to the first virtual machine and to the second virtual machine; measuring a delay time of the communications channels; getting a first local time of the first virtual machine; getting a local time of the second virtual machine; getting a second local time of the first virtual machine; and determining the time offset as the first local time of the first virtual machine plus the second local time of the first virtual machine minus twice the local time of the second virtual machine.

Example 6. The method of any one of examples 1 to 5, including storing timestamps of traces with timestamps based on the first virtual clock counter, and the timestamps of traces with timestamps based on the second virtual clock counter as adjusted according to the time offset, in a trace file.

Example 7. The method of any one of examples 1 to 6, including periodically repeating determining the time offset and adjusting the timestamps of traces.

Example 8 is an apparatus including a memory to store a first virtual clock counter of a first virtual machine and a second virtual clock counter of a second virtual machine; and a processor to determine a time offset between the first virtual clock counter and the second virtual clock counter; and adjust timestamps of traces with timestamps based on the second virtual clock counter according to the time offset.

Example 9. The apparatus of example 8, including the processor to adjust the timestamps by subtracting the time offset from the timestamps of traces.

Example 10. The apparatus of any one of examples 8 to 9, wherein the processor to determine the time offset includes the processor to run a precision time protocol between the first virtual machine and the second virtual machine.

Example 11. The apparatus of any one of examples 8 to 9, wherein the processor to determine the time offset includes the processor to run a precision time protocol between the first virtual machine and a second computing system to determine a first time offset, run the precision time protocol between the second virtual machine and the second computing system to determine a second time offset, and determine the time offset as a difference between the first time offset and the second time offset.

Example 12. The apparatus of any one of examples 8 to 9, wherein the processor to determine the time offset includes the processor to initialize communications channels to the first virtual machine and to the second virtual machine; measure a delay time of the communications channels; get a first local time of the first virtual machine; get a local time of the second virtual machine; get a second local time of the first virtual machine; and determine the time offset as the first local time of the first virtual machine plus the second local time of the first virtual machine minus twice the local time of the second virtual machine.

Example 13. The apparatus of any one of examples 8 to 12, including the processor to store timestamps of traces with timestamps based on the first virtual clock counter, and timestamps of traces with timestamps based on the second virtual clock counter as adjusted according to the time offset, in a trace file in the memory.

Example 14. A non-transitory computer-readable storage medium including instructions, that when executed by one or more processors of a computing system, cause the one or more processors to perform the method of any of claims 1-7.

Example 15. An apparatus including means for performing the method of any of claims 1-7.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structures suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Various embodiments have been described. These and other embodiments are within the scope of the following claims.

What is claimed is:

1. A method comprising:

determining, by a computing system, a time offset between a first virtual machine having a first virtual clock counter of the computing system and a second virtual machine having a second virtual clock counter of the computing system;

storing, by the computing system and in a memory page shared by the first virtual machine and the second virtual machine, information regarding the first virtual clock counter;

reading, by the computing system, the information regarding the first virtual clock counter; and adjusting, by the computing system and based on the information regarding the first virtual clock counter, timestamps of traces based on the second virtual clock counter according to the time offset.

2. The method of claim 1, wherein adjusting the timestamps further comprises subtracting the time offset from the timestamps.

3. The method of claim 1, wherein determining the time offset further comprises running a precision time protocol between the first virtual machine and the second virtual machine.

4. The method of claim 1, wherein determining the time offset further comprises:

running a precision time protocol between the first virtual machine and a second computing system to determine a first time offset;

running the precision time protocol between the second virtual machine and the second computing system to determine a second time offset; and determining the time offset as a difference between the first time offset and the second time offset.

5. The method of claim 1, wherein determining the time offset further comprises:

initializing communications channels to the first virtual machine and to the second virtual machine;

measuring a delay time of the communications channels;

getting a first local time of the first virtual machine;

getting a local time of the second virtual machine;

getting a second local time of the first virtual machine; and determining the time offset as the first local time of the first virtual machine plus the second local time of the first virtual machine minus twice the local time of the second virtual machine.

6. The method of claim 1, comprising storing, by the computing system, timestamps of traces based on the first virtual clock counter and the timestamps of traces based on the second virtual clock counter as adjusted according to the time offset, in a trace file.

7. The method of claim 1, comprising periodically repeating, by the computing system, the determining the time offset between the first virtual machine and the second virtual machine and the adjusting the timestamps of traces based on the second virtual clock counter.

8. A computing system comprising:

a memory configured to store a first virtual clock counter of a first virtual machine and a second virtual clock counter of a second virtual machine; and

one or more programmable processors in communication with the memory and configured to:

determine a time offset between the first virtual clock counter and the second virtual clock counter;

store, in a memory page shared by the first virtual machine and the second virtual machine, information regarding the first virtual clock counter;

read the information regarding the first virtual clock counter; and adjust, based on the information regarding the first virtual clock counter, timestamps of traces based on the second virtual clock counter according to the time offset.

9. The computing system of claim 8, wherein the one or more programmable processors are further configured to adjust the timestamps by subtracting the time offset from the timestamps.

10. The computing system of claim 8, wherein to determine the time offset the one or more programmable processors are further configured to run a precision time protocol between the first virtual machine and the second virtual machine.

11. The computing system of claim 8, wherein to determine the time offset, the one or more programmable processors are further configured to:

run a precision time protocol between the first virtual machine and a second computing system to determine a first time offset;

run the precision time protocol between the second virtual machine and the second computing system to determine a second time offset; and determine the time offset as a difference between the first time offset and the second time offset.

12. The computing system of claim 8, wherein to determine the time offset, the one or more programmable processors are further configured to:

initialize communications channels to the first virtual machine and to the second virtual machine;

measure a delay time of the communications channels;

get a first local time of the first virtual machine;

get a local time of the second virtual machine;

get a second local time of the first virtual machine; and determine the time offset as the first local time of the first virtual machine plus the second local time of the first virtual machine minus twice the local time of the second virtual machine.

13. The computing system of claim 8, wherein the one or more programmable processors are further configured to store, in a trace file in the memory, timestamps of traces based on the first virtual clock counter and the timestamps of traces based on the second virtual clock counter as adjusted according to the time offset.

14. The computing system of claim 8, wherein the one or more programmable processors are further configured to repeat the determining the time offset and the adjusting the timestamps of traces based on the second virtual clock counter.

15. A non-transitory computer-readable storage medium encoded with instructions that, when executed by one or more processors of a computing system, cause the one or more processors to:

determine a time offset between a first virtual machine having a first virtual clock counter of the computing system and a second virtual machine having a second virtual clock counter of the computing system;

store, in a memory page shared by the first virtual machine and the second virtual machine, information regarding the first virtual clock counter;

read the information regarding the first virtual clock counter; and adjust, based on the information regarding the first virtual clock counter, timestamps of traces based on the second virtual clock counter according to the time offset.

16. The non-transitory computer-readable storage medium of claim 15, wherein to adjust the timestamps of traces, the instructions further cause the one or more processors to subtract the time offset from the timestamps.

17. The non-transitory computer-readable storage medium of claim 15, wherein to determine the time offset, the instructions further cause the one or more processors to run a precision time protocol between the first virtual machine and the second virtual machine.

18. The non-transitory computer-readable storage medium of claim 15, wherein to determine the time offset, the instructions further cause the one or more processors to:

run a precision time protocol between the first virtual machine and a second computing system to determine a first time offset;

run the precision time protocol between the second virtual machine and the second computing system to determine a second time offset; and determine the time offset as a difference between the first time offset and the second time offset.

\* \* \* \* \*